United States Patent [19]

Berta

[11] Patent Number: 5,196,462
[45] Date of Patent: Mar. 23, 1993

[54] ZINC-SALTS OF CERTAIN MERCAPTO COMPOUNDS AS ANTIOXIDANTS FOR HIGH TEMPERATURE AGING OF THERMOPLASTIC ELASTOMERS

[75] Inventor: Dominic A. Berta, Wilmington, Del.

[73] Assignee: Himont Incorporated, Wilmington, Del.

[21] Appl. No.: 762,092

[22] Filed: Sep. 18, 1991

Related U.S. Application Data

[63] Continuation-in-part of Ser. No. 701,234, May 16, 1991, abandoned.

[51] Int. Cl.$^5$ .............................................. C08K 5/34
[52] U.S. Cl. .................................................... 524/94
[58] Field of Search ................... 524/94; 525/240, 232

[56] References Cited

U.S. PATENT DOCUMENTS

| | | | |
|---|---|---|---|
| 2,997,456 | 8/1961 | Mills | 524/94 |
| 3,635,862 | 1/1972 | Dunn | 524/94 |
| 4,260,661 | 4/1981 | Walters et al. | 428/389 |
| 4,824,883 | 4/1989 | Walters et al. | 524/93 |
| 4,943,615 | 7/1990 | Yamawaki | 525/240 |
| 4,985,502 | 1/1991 | Izumi et al. | 525/194 |

FOREIGN PATENT DOCUMENTS

| | | |
|---|---|---|
| 2062603 | 6/1971 | Fed. Rep. of Germany. |
| 49-15044 | 4/1974 | Japan. |
| 58-122943 | 7/1983 | Japan. |
| 59-166543 | 9/1984 | Japan. |
| 1-279939 | 11/1989 | Japan. |
| 1-297445 | 11/1989 | Japan. |
| 2-67346 | 3/1990 | Japan. |

Primary Examiner—Kriellion S. Morgan

[57] ABSTRACT

Disclosed are dynamically partially or fully crosslinked thermoplastic elastomers, having incorporated therein zinc salts of certain mercapto compounds.

12 Claims, No Drawings

ZINC-SALTS OF CERTAIN MERCAPTO COMPOUNDS AS ANTIOXIDANTS FOR HIGH TEMPERATURE AGING OF THERMOPLASTIC ELASTOMERS

FIELD OF THE INVENTION

This invention relates generally to high temperature aging of dynamically partially or fully crosslinked thermoplastic elastomers. More particularly, it relates to antioxidants for high temperature aging of dynamically partially or fully crosslinked thermoplastic elastomers. Specifically, it relates zinc salts of certain mercapto compounds for high temperature aging of dynamically partially or fully crosslinked thermoplastic elastomers based on polyolefin/ethylene-$C_{3-4}$ copolymer rubber.

BACKGROUND OF THE INVENTION

Polyolefins and polyolefin compositions are typically used in products that are subjected to elevated temperatures which accelerate the rate of oxidation degradation in the polyolefin composition, commonly referred to as "heat aging", where long term performance is desired or required. Thus, the ability of polyolefins and compositions thereof to retain their original properties, such as elongation and tensile strength, at elevated temperatures during the required or desired term of performance is important.

Various antioxidant compounds or combinations thereof have been found to have a retarding or stabilizing effect on the "heat aging" of polyolefins and polyolefins compositions and therefore have been widely used. For example, U.S. Pat. No. 2,997,456 discloses stabilization of polyolefins against thermal degradation by incorporating metal salts of mercapto, selenide or telluride benzimidazole compounds into the polyolefins.

U.S. Pat. Nos. 4,260,661 and 4,824,883 disclose using an antioxidant system comprising a combination of a zinc salt of a mercaptoimidazole with a sterically hindered di-tertiary butyl phenol in polyolefin polymers and compounds thereof, such as polyethylene and copolymers of ethylene and other polymerizable materials.

Japanese Patent 58-122943 discloses a synergistic combination of antioxidants, a phenol, a 1,2-dihydroquinoline and an organic zinc salt, incorporated in polyolefins to achieve better heat stability.

While the polyolefin compositions of the above-mentioned prior art give improved heating aging properties by incorporating antioxidants or combinations thereof, the percent retention of these original properties is still low.

SUMMARY OF THE INVENTION

One embodiment of the present invention relates to a dynamically partially crosslinked thermoplastic elastomer comprising:

(A) 100 parts of a thermoplastic elastomer containing (i) 30 to 70 parts propylene polymer material, (ii) 30 to 70 parts amorphous olefin copolymer rubber which is xylene soluble at room temperature, (iii) 10 to 30 parts semi-crystalline ethylene-propylene or ethylene-butene copolymer which is xylene insoluble at room temperature, and, optionally, (iv) 2 to 20 parts polybutene-1 based on 100 parts of (i)+(ii)+(iii), and (B) 1.4 to 4.0 parts of a zinc salt of a mercapto compound, based on 100 parts of (i)+(ii)+(iii), wherein at least a 50% retention of the original physical properties is maintained at elevated temperatures.

Another embodiment of the present invention relates to a dynamically fully crosslinked thermoplastic elastomer comprising:

(A) 100 parts of a thermoplastic elastomer containing (i) 20 to 70 parts propylene polymer material and (ii) 80 to 30 parts amorphous olefin copolymer rubber which is xylene soluble at room temperature, and (B) 1.4 to 4.0 parts of a zinc salt of a mercapto compound, based on 100 parts of (i)+(ii), wherein at least a 50% retention of the original physical properties is maintained at elevated temperatures.

DETAILED DESCRIPTION OF THE INVENTION

Unless otherwise specified all parts and percentages are by weight in this specification.

The propylene polymer material used in the present invention as component (i) includes crystalline polypropylene having an isotactic index of greater than 90%, preferably from 95 to 98%; and an ethylene-propylene random copolymer having an ethylene content of up to 10%, preferably from about 1% up to about 3%, and is from about 90 to about 94% insoluble in xylene at room temperature. Preferably, the propylene polymer material is polypropylene. The propylene polymer material in the partially crosslinked thermoplastic elastomer is present in an amount of from 30 to 70, preferably 30 to 50 parts. In the fully crosslinked thermoplastic elastomer, the propylene polymer material is present in an amount of from 20 to 70, preferably 50 to 70 parts.

In the partially crosslinked thermoplastic elastomer of the present, the amorphous olefin copolymer is soluble in xylene at room temperature and is present in the amount of from 70 to 30 parts, preferably from 50 to 30 parts. Suitable amorphous olefin copolymer rubbers used in the present invention are selected from the group consisting of ethylene-propylene copolymer rubber, ethylene-butene copolymer rubber, ethylene-propylene-non-conjugated diene monomer rubber and an ethylene-butene-non-conjugated diene monomer rubber, wherein the ethylene content is from 30 to 70% and the diene content is from 1 to 10%, and preferably from 1 to 5%. The preferred olefin copolymer rubber is ethylene-propylene copolymer rubber.

The amorphous olefin copolymer rubber of the fully crosslinked thermoplastic elastomer is soluble in xylene at room temperature and is present in the amount of from 80 to 30 parts, and preferably from 70 to 50 parts. Examples of amorphous olefin copolymer rubber used in the fully crosslinked thermoplastic elastomer of this invention include an ethylene-propylene-non-conjugated diene monomer rubber or an ethylene-butene-non-conjugated diene monomer rubber having an ethylene content of from 30 to 70% and a diene content of from 1 to 10%, and preferably from 1 to 5%. Preferably, the amorphous olefin rubber is ethylene-propylene-non-conjugated diene monomer rubber containing 30 to 70% ethylene and 1 to 5% diene.

Examples of the non-conjugated dienes include 1,4-hexadiene, ethylidene-norbornene and dicyclopentadiene.

The term "amorphous" as used herein means from 0 to 22%, preferably 0 to 10%, and most preferably from 0 to 5%, crystallinity as measured by differential scanning calorimetry (DSC).

The semi-crystalline, ethylene-propylene or ethylene-butene copolymer, (iii), of the dynamically partially crosslinked thermoplastic elastomer consist substantially of units of ethylene, greater than 90%, preferably greater than 95%, and is insoluble in xylene at room temperature. The term "semi-crystalline" as used in this application is defined as a crystallinity of from 20 to 60%, and preferably from 25% to 50%, as measured from the heat of fusion of said ethylene-propylene copolymer or ethylene-butene copolymer, which is determined by differential scanning calorimetry on a 5 to 10 mg sample of the copolymer heated at 20° C./min. and assuming the heat fusion of 100% crystalline polyethylene at 400° K. is 293 J/g as described in U. Gaur and B. Wunderlich, J. Phys. Chem. Ref. Data, 10 (1), 119 (1981). The percent crystallinity is calculated by dividing the heat of fusion of the copolymer by the heat of fusion of 100% crystalline polyethylene and multiplying by 100. Said ethylene-propylene copolymer or ethylene-butene copolymer is present in the amount of 8 to 30 parts, preferably 10 to 20 parts. The total amount of (i)+(ii)+(iii) in the dynamically partially crosslinked composition of the present invention is 100 parts.

When present in the dynamically partially crosslinked thermoplastic elastomer, the polybutene-1, (iv), is a crystalline isotactic polybutene having a density of from 0.914 to 0.919 g/cm³, with a melt index of from 1 to 100 g/10 min. The polybutene-1 is present in the present invention in an amount of from 2 to 20 parts, and preferably from 4 to 15 parts, based on 100 parts of (i)+(ii)+(iii). The ratio of the the polybutene-1 component to the rubber must be less than 0.5, and preferably from 0.1 to 0.3.

The zinc salt of a mercapto compound used in the composition of the present invention can be a zinc 2-mercaptobenzothiazole, a zinc 2-mercaptobenzimidazole or a zinc 2-mercaptotoluimidazole. The zinc salt is present in an amount of from 1 to 4 parts, preferably from 1.4 to 3 parts, based on 100 parts of (A).

The preparation of the dynamically partially crosslinked thermoplastic elastomer of the present invention is carried out using a peroxide curing system comprising an organic peroxide and at least one crosslinking aid selected from 1,2-polybutadiene and furan derivatives of the formula:

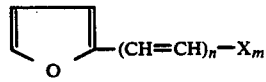

or

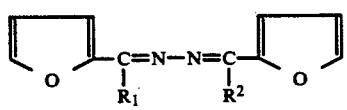

where X is a radical of the formula —CHO, —COOH, —CHONH₂, —CN, —NO, —CH₂COCH₂COOR, —CH(COOR)₂, where R is an aryl containing 6–8 carbon atoms, or an alkyl containing 1–4 carbon atoms, n is 1 or 2, m is a number equal to the free valance of X, $R^1$ and $R^2$, same or different, are hydrogen, alkyl containing 1 to 4 carbon atoms or cycloalkyl containing 5 to 8 carbon atoms.

The peroxide crosslinking agent must have a half-life of 3.3 to 20 minutes, preferably 7 to 18 minutes, at 160° C. in ethylene-propylene-diene monomer rubber (EPDM). Suitable examples of peroxides used in the present invention include 1,1'-bis(t-butylperoxy)diisopropyl benzene, dicumyl peroxide, n-butyl-4,4'-bis(t-butylperoxy)valerate, and 2,5-di-(t-butylperoxy)-2,5-dimethylhexene. The peroxide is present in an amount, based on 100 parts of (i)+(ii)+(iii), of from 0.5 to 3 parts, preferably, from 1 to 2.5 parts, in liquid or solid supported form and are commercially available.

The 1,2-polybutadiene has a molecular weight of at least 1,300 to about 13,000, preferably, at least 2,400 to 13,000. The 1,2-vinyl content is at least 50%, and preferably 50 to 90%, and most preferably 70 to 90%. The amount of 1,2-polybutadiene present is from 2 to 20 parts, preferably 4 to 12 parts, based on 100 parts of (i)+(ii)+(iii). The 1,2-polybutadiene can be used in the liquid or solid supported form and is commercially available in both forms. When the polybutadiene is added as a liquid, it is added in small increments of 25 to 50% over a period of 2 to 6 minutes, and when added as a solid, it is added all at one time.

The furan derivatives of the formula described above that can be used in the peroxide curing system of the present invention are known in the art and can be prepared according the method described in U.S. Pat. No. 2,738,338 which method is incorporated herein by reference. Suitable examples include 1,5-difurfuryl-1,4-pentadiene-3-one, difurfuralaldzene, β-(α-furyl)acrolein, 5-(α-furyl)pentadienal, α-furylacylamide, α-furylacrylonitrile, β-(α-furyl)acrylic acid and its esters, esters of furfurylidene and the like. The furan derivatives are used in an amount of from 0.15 to 3, and preferably 0.17 to 2 parts based on 100 parts of (i)+(ii)+(iii).

The dynamically partially cured thermoplastic elastomer of the present invention is prepared by adding the peroxide curing system described above to a mixture of components (i), (ii), (iii), and, optionally, (iv), and subjecting said mixture to curing conditions while masticating the mixture to bring about the desired dynamic partial cure.

Preferably, components (i), (ii), and (iii) are formed in a reactor of series of reactors in at least two stages by first polymerizing propylene to form component (i) and then polymerizing propylene or butene and ethylene in the presence of component (i) and the catalyst used in the first stage to form components (ii) and (iii) The polymerization can be conducted in liquid or gas phase or in liquid-gas phase. In the alternative, components (i), (ii), and (iii) can each be prepared separately and then mixed by melt-kneading.

The term "partially cured", as referred to herein, means that the degree of curing, in terms of the gel content, is at least 80% and no more than 94% in cyclohexane according to the test set forth herein below. Preferably, the gel content is from 85 to 92%.

In preparing the fully crosslinked thermoplastic elastomer of the present invention a phenolic curative system is used consisting of a halogenated or non-halogenated phenolic resin and a combination of a metal oxide and a halogen donor.

The halogenated or non-halogenated phenolic curing resin is present in an amount of from 2 to 10 parts, preferably from 3 to 8 parts, based on 100 parts of the amorphous olefin rubber. Suitable halogenated and non-halogenated phenolic curing resin are brominated methylol phenolic resins and methylol phenolic resins, such as SP-1045 phenolic resin, SP-1055 phenolic resin and SP-1056 phenolic resin.

The metal oxide present in the phenolic curative system is selected from the group consisting of iron oxide, titanium oxide, magnesium oxide, silicon dioxide and zinc oxide, preferably zinc oxide. The metal oxide is present in an amount of from 2 to 10 parts, preferably from 4 to 8 parts, based on 100 parts of the amorphous rubber.

Examples of the halogen donors used in the phenolic curative system include $SnCl_2.2H_2O$, $ZnCl_2$ and $FeCl_3.6H_2O$, polychloroprene, chlorosulfonated polyethylene, halogenated butyl rubbers and chlorinated paraffin. The halogen donors are present in the phenolic curative system in an amount of from 0.05 to 10 parts, preferably from 0.2 to 5 parts, based 100 parts of the amorphous olefin rubber.

The term "fully crosslinked", as referred to herein, means that the degree of curing, in terms of gel content, is at least 97% in cyclohexane according to the test set forth herein below.

The mixing and/or mastication temperature is between 150° C. and 225° C., preferably 170° C and 215° C., for a period of about 2 to 30 minutes, preferably 3 to 20 minutes, to dynamically partially or fully cure the thermoplastic elastomer of the present invention. In the partial curing system at the above curing conditions at least 97% of the peroxide curing agent is depleted, generally 98 to 99%, based on the theoretical half-life at 160° C. in EPDM. The mastication or shearing process can be carried out on an open roll, in an internal mixer (e.g., Banbury or Haake mixers), and single-screw or twin-screw extruders.

In preparing the partially cured thermoplastic elastomer of the present invention, preferably, a homogeneous blend of components (i), (ii) and (iii) is prepared in a series of reactors in two stages as described above, wherein the first stage is in liquid propylene and the second stage is in gas phase using a catalyst and procedure as set forth in U.S. Ser. No. 07/515,936, now abandoned filed Apr. 27, 1990, the disclosures of which are incorporated herein by reference. When polybutene, component (d), is present in the composition it is added to the homogeneous blend prepared as described above, and mixed at a temperature sufficient to soften the propylene polymer material or at a temperature above the melting point of the propylene polymer material until a homogeneous mixture is formed. The crosslinking aid is added and mixing continues for approximately 1 to 2 minutes. Then the peroxide is added and mixed until there is no change in viscosity, about 5 to 7 minutes, indicating that substantially all the peroxide has been used. The mastication is continued for an additional 1 to 2 minutes and then the zinc salt of the mercapto compound is added and mixing continues for an additional 1 to 3 minutes.

The fully crosslinked thermoplastic elastomer of the present invention is obtained by mechanically blending pre-formed components (i) and (ii). According to this method, the propylene polymer material, the amorphous olefin copolymer rubber and the zinc salt are blended at a temperature sufficient to soften the propylene polymer material or at a temperature above the melting point of the propylene polymer material until a homogeneous mixture is obtained. Then the phenolic curing system is added and the mixture is masticated for 2 to 4 minutes at a temperature sufficiently high enough to effect curing of the rubber.

In another method, the partially or fully crosslinked thermoplastic elastomer of this invention can be prepared by first dry blending all of the components. According to this method, all of the components are dry blended by tumble blending, e.g. in a Henschel mill or a V-blender, herein referred to as the premixed method. The blend is then charged to the chamber of a high intensity mixer, mixed until fluxed and constant viscosity is obtained, approximately 1 to 3 minutes, and mastication is continued for additional 1 to 4 minutes.

In addition, the peroxide curing system of the partially crosslinked thermoplastic elastomer may further contain other coagents, such as phenylene-bis-maleimide and/or sulfur donors, such as benzothiazyl disulfide, tetramethylthiuram monosulfide, alkylphenol disulfide and N,N'diethylthiourea. The amount of other coagent used is in the range of 0.5 to 3 parts, preferably 1 to 2.5, and the amount of sulfur donor is in the range of from about 0.15 to 3, preferably from 0.17 to 2 parts, based on 100 parts of (i)+(ii)+(iii).

When the peroxide curing system contains an additional coagent and/or sulfur donor, the coagent is generally added along with the 1,2-polybutadiene and the sulfur donor is generally added along with the peroxide.

In addition to the above major components, an antioxidant is generally present in the partially or fully crosslinked thermoplastic elastomer in an amount of from 0.1 to 0.9 parts, based on 100 parts of (A). Suitable examples of antioxidants used in this invention are thiophenols, such as 4,4'-thio-bis-(6-t-butyl-m-cresol); phosphites, such as trisnonyl-phenyl phosphite; phenolic esters, such as tetrakis[methylene(3,5-di-tert-butyl-4-hydroxy-hydrocinnamate)]methane; thiodipropionates, such as dilaurylthiopropionate; hydroquinones, such as 2,5-di-t-butyl-hydroquinones; and quinolines, such as 2,2,4-trimethyl-1,2-dihydroquinone.

Also, the partially or fully crosslinked thermoplastic elastomer of the present invention may contain other conventional additives, for example, extender oils, such as paraffinic and naphthenic oils, in an amount of from 20 to 100 parts, preferably 25 to 60 parts, and most preferably 25 to 50 parts, based on 100 parts of amorphous olefin copolymer rubber; or zinc oxide, in an amount of from 2 to 6 parts, based on 100 parts of (A).

When the partially or fully crosslinked thermoplastic elastomer is prepared by the premixed method, the extender oil is generally added after the premix is charged to the mixer and fluxing of the ingredients has begun.

The present invention will be illustrated in greater detail with reference to the examples of the invention set forth below. The test samples and physical properties of the following working examples and comparative examples were prepared and measured according to the following methods.

| Tensile Strength | ASTM D-412 |
|---|---|
| Break Elongation | ASTM D-412 |
| 100% Modulus | ASTM D-412 |
| Shore D Hardness | ASTM D-2240 |

Percent gel content is determined by soaking a weighed 1.5 inch by 0.75 inch by 0.080 inch test specimen in about 100 ml of cyclohexane at about 23° C. for 48 hours, removing the sample and drying to constant weight (about 72 hours) in a vacuum oven at 80° C. The % gel was calculated as:

$$\% \text{ gel} = \frac{\frac{\text{Initial wt.}}{\text{of rubber}} - \frac{\text{Wt. of rubber}}{\text{extracted}}}{\text{Initial wt. of rubber (in sample)}} \times 100\%$$

Examples 1–5 of the invention and Control Examples 1–6 illustrate dynamically partially crosslinked thermoplastic elastomers.

EXAMPLE 1

To 100 parts of a thermoplastic elastomer, Hifax RA-061 resin having 40 parts crystalline polypropylene having an isotactic index of about 92, about 40 parts of ethylene-propylene copolymer rubber having an ethylene content of about 50%, and 20 parts semi-crystalline, essentially linear ethylene-propylene copolymer which is insoluble in xylene at room temperature and has an ethylene content of 96%, prepared in a reactor as described above, in a Banbury is added 4 parts polybutene, 20 parts Pro-fax 6501 crystalline polypropylene having a melt flow rate of 4.0 dg/min., 4 parts 1,2-polybutadiene, 0.6 parts alkyl phenol disulfide, 6 parts ZnO, 0.3 parts 4,4'-thio-bis(6-tert-butyl-m-cresol) and 4.2 parts 1,1'-bis(t-butylperoxy)diisopropyl benzene. The ingredients are blended at 121° C. for approximately 1 to 3 minutes until the polymer melted and the temperature reached 171° C. Six parts of oil is added and mixing continued for 30 to 60 seconds, then the remaining 6 parts of oil is added. Mixing is continued for an additional 45 to 70 seconds, and then 0.6 parts tetrakis[methylene(3,5-di-tert-butyl-4-hydroxy-hydrocinnamate)]methane is added. Mixing is continued for an additional minute until a homogeneous mixture is obtained. The mixture is then charged to the throat of a single screw extruder, set at 200° C., and strands of the material are extruded through annular dies into water and hot cut at the die face into pellets. Said pellets are carried over by vacuum into a centrifugal drier and collected.

The collected pellets are introduced into a Haake internal mixer, preset at 182° C., and mixed until melting occurred. Then 2.1 parts of zinc 2-mercaptobenzothiazole is added and mixing continued for approximately 2 minutes.

The mixture is then transferred onto compression mold bottom plattens, covered with top plattens and compression molded at 215° C. for 3 minutes at 10 MPa. The plattens are removed from the hot press and placed in a room temperature press and cooled under 10 MPa for about 15 minutes and removed for testing.

The physical properties are set forth in Table 1.

EXAMPLES 2 AND 3

Examples 2 and 3 are prepared according to the procedure and ingredients of Example 1 except that 1.4 and 2.1 parts of zinc 2-mercaptotoluimidazole, respectively, are used instead of 2.1 parts of zinc 2-mercaptobenzothiazole. The physical properties are set forth in Table 1.

Control 1

Control Example 1 is prepared according to the procedure and ingredients of Example 1 except that no zinc 2-mercaptobenzothiazole is used. The physical properties are set forth in Table 1.

Control 2 and 3

Controls 2 and 3 are prepared according to the procedure and ingredients of Example 1 except that 1.2 and 1.8 parts of zinc dibutyldithiocarbamate are used instead of zinc 2-mercaptobenzothiazole. The physical properties are set forth in Table 1.

Control 4 and 5

Controls 4 and 5 are prepared according to the procedure and ingredients of Example 1 except that 1.2 and 1.8 parts of amyl zimate. The physical properties are set forth in Table 1.

TABLE 1

| | Ex. 1 | Ex. 2 | Ex. 3 | C-1 | C-2 | C-3 | C-4 | C-5 |
|---|---|---|---|---|---|---|---|---|
| Ingredients | | | | | | | | |
| Hifax RA061 resin | 100 | 100 | 100 | 100 | 100 | 100 | 100 | 100 |
| Polybutene-1 | 4 | 4 | 4 | 4 | 4 | 4 | 4 | 4 |
| 1,2-Polybutadiene | 4 | 4 | 4 | 4 | 4 | 4 | 4 | 4 |
| Pro-Fax 6501 | 20 | 20 | 20 | 20 | 20 | 20 | 20 | 20 |
| 1,1'-bis(t-butylperoxy)diisopropyl benzene | 4.2 | 4.2 | 4.2 | 4.2 | 4.2 | 4.2 | 4.2 | 4.2 |
| Alkyl phenol disulfide | 0.6 | 0.6 | 0.6 | 0.6 | 0.6 | 0.6 | 0.6 | 0.6 |
| ZnO | 6 | 6 | 6 | 6 | 6 | 6 | 6 | 6 |
| Tetrakis[methylene(3,5-di-tert-butyl-4-hydroxy-hydrocinnamate)]methane | 0.6 | 0.6 | 0.6 | 0.6 | 0.6 | 0.6 | 0.6 | 0.6 |
| 4,4'-thio-bis-(6-tert-butyl-m-cresol) | 0.3 | 0.3 | 0.3 | 0.3 | 0.3 | 0.3 | 0.3 | 0.3 |
| Paraffin oil | 12 | 12 | 12 | 12 | 12 | 12 | 12 | 12 |
| Zinc salt of 2-mercaptobenzothiazole | 2.1 | — | — | — | — | — | — | — |
| Zinc salt of 2-mercaptotoluimidazole | — | 1.4 | 2.1 | — | — | — | — | — |
| Zinc salt of dibutyl dithiocarbamate | — | — | — | — | 1.2 | 1.8 | — | — |
| Zinc salt of diamyl dithiocarbamate | — | — | — | — | — | — | 1.2 | 1.8 |
| Orig. Properties | | | | | | | | |
| 100% Modulus, psi | 1470 | 1250 | 1460 | 1340 | 1460 | 1400 | 1445 | 1446 |
| Tensile Strength, psi | 2320 | 2120 | 2230 | 2080 | 2380 | 2035 | 2440 | 2120 |
| Elongation, % | 530 | 560 | 540 | 470 | 550 | 489 | 560 | 470 |
| Shore D | 47 | 46 | 46 | 42 | 46 | 44 | 45 | 45 |
| % Gel | — | 87.7 | — | — | — | — | — | — |
| Air Aging @ 165° C./7 days | | | | | | | | |
| 100% Modulus, psi | 1390 | 1300 | 1370 | broke | — | 1230 | — | — |
| % Retention | 94 | 104 | 94 | — | — | 88 | — | — |
| Tensile Strength, psi | 1690 | 1640 | 1730 | — | 1100 | 1280 | 1130 | 1060 |
| % Retention | 73 | 77 | 78 | — | 46 | 63 | 46 | 50 |
| Elongation, % | 395 | 405 | 418 | — | 22 | 240 | 20 | 24 |
| % Retention | 74 | 73 | 77 | — | 4 | 49 | 4 | 4 |

TABLE 1-continued

|  | Ex. 1 | Ex. 2 | Ex. 3 | C-1 | C-2 | C-3 | C-4 | C-5 |
|---|---|---|---|---|---|---|---|---|
| Shore D | 47 | 47 | 46 | — | 44 | 42 | 40 | 39 |

As demonstrated by the data, the compositions of Examples 1 thru 3 containing the zinc mercapto salts of the invention retained 50% or better of their original elongation property at 165° C. for 7 days, as compared to breaking (no retention) of control 1 and retention of less than 50% and blooming of controls 2 through 5 containing conventional zinc salts of dithiocarbamate compounds.

EXAMPLES 4 AND 5

The procedure and ingredients are the same as Example 1, except that 1.4 and 2 parts of zinc 2-mercaptobenzothiazole is used, all of the ingredients were premixed except the oil and no Irganox is added. The physical properties are set forth below in Table 2.

TABLE 2

|  | Ex. 4 | Ex. 5 |
|---|---|---|
| Hifax RA061 | 100 | 100 |
| Polybutene-1 | 4 | 4 |
| 1,2-polybutadiene | 4 | 4 |
| Pro-Fax 6501 resin | 20 | 20 |
| 1,1'-bis(t-butylperoxy)diisopropyl benzene | 4.2 | 4.2 |
| Alkyl phenol disulfide | 0.6 | 0.6 |
| ZnO | 6 | 6 |
| 4,4'-thio-bis(6-tert-butyl-m-cresol) | 0.3 | 0.3 |
| Paraffin Oil | 12 | 12 |
| Zinc salt of 2-mercaptobenzothiazole | 1.4 | 2.0 |
| Original Properties |  |  |
| 100% Modulus, psi | 1373 | 1340 |
| Tensile Strength, psi | 2274 | 2310 |
| Elongation | 495 | 520 |
| Shore D | 43 | 41 |
| Air Aging @ 165° C./7 days |  |  |
| 100% Modulus, psi | 1050 | 1080 |
| % Retention | 76 | 81 |
| Tensile Strength, psi | 1200 | 1400 |
| % Retention | 53 | 61 |
| Elongation, % | 360 | 440 |
| % Retention | 73 | 84 |
| Shore D | 39 | 39 |

EXAMPLE 6

This Example illustrates a dynamically fully crosslinked thermoplastic elastomer of the present invention.

In a Haake internal mixer are blended 40 parts Profax 6701 crystalline polypropylene having a melt flow rate of 0.8 dg/min., 60 parts Epsyn 70-A ethylene-propylene-ethylidene norbornene terpolymer rubber having an ethylene content of 55%, an ethylidene norbornene content of 4.4% and a Mooney viscosity of 100(ML 1+4 @121° C), and 0.1 parts of tetrakis[methylene(3,5-di-t-butyl-4-hydroxy-hydrocinnamate)]methane at a temperature of 200° C. at 100 rpm until the polypropylene had melted and then for an additional two minutes. 2 parts zinc 2-mercaptobenzothiazole is added, mixing continued for approximately one minute, then 3 parts SP-1045 methylol phenolic resin and 0.3 parts $SnCl_2.2H_2O$ are added. Mixing continued for approximately 3 to 4 minutes until constant viscosity is reached. Then 4 parts zinc oxide was added and mixed for about one minute. Five parts of the 10 parts Sunpar 2280 paraffin oil is added, mixed for 45 to 70 seconds, and then the remaining 5 parts of the oil is added.

The mixture is then transferred onto compression mold bottom plattens covered with top plattens and compression molded at 215° C. for 3 minutes at 10 MPa. The plattens are removed from the hot press, cooled and then removed for aging.

The physical properties are set forth in Table 3.

Control 7

Control 7 is prepared according to the procedure and ingredients of Example 6 except that it did not contain zinc 2-mercaptobenzothiazole. The physical properties are set forth in Table 3.

TABLE 3

|  | Ex. 1 | C-7 |
|---|---|---|
| Ingredients |  |  |
| Pro-fax 6701 | 40 | 40 |
| Epsyn 70-A | 60 | 60 |
| Tetrakis[methylene(3,5-di-tert-butyl-4-hydroxy-hydrocinnamate)]methane | 0.1 | 0.1 |
| SP-1045 phenolic resin | 3 | 3 |
| ZnO | 4 | 4 |
| $SnCl_2.2H_2O$ | 0.3 | 0.3 |
| Zinc salt of 2-mercaptobenzothiazole | 2 | — |
| Sunpar 2280 paraffin oil | 10 | 10 |
| Original Properties |  |  |
| 100% Modulus, psi | 705 | 692 |
| Tensile Strength, psi | 1032 | 934 |
| Elongation, % | 367 | 308 |
| Shore D | 30 | 25 |
| Gel, % | 99.3 | 98.8 |
| Air Aging @ 165° C./7days |  |  |
| 100% Modulus, psi | 900 | — |
| % Retention | 127 | — |
| Tensile Strength, psi | 1400 | 475 |
| % Retention | 135 | 50 |
| Elongation, % | 300 | 25 |
| % Retention | 82 | 8 |
| Shore D | 29 | 23 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A dynamically partially crosslinked thermoplastic elastomer comprising, by weight,
   (A) 100 parts of a thermoplastic elastomer containing
       (i) 30 to 70 parts propylene polymer material selected from the group consisting of a crystalline polypropylene having an isotactic index of greater than 90% and an ethylene-propylene random copolymer having an ethylene content of up to about 10%, (ii) 70 to 30 parts amorphous olefin copolymer rubber selected from the group consisting of an ethylene-propylene copolymer rubber, an ethylene-butene copolymer rubber, an ethylene-propylene-non-conjugated diene monomer rubber and an ethylene-butene-non-conjugated diene monomer rubber, wherein the ethylene content is from 30 to 70% and the diene content is from 1 to 10% and is xylene soluble at room temperature, (iii) 10 to 30 parts semi-crystalline, ethylene-propylene or ethylene-butene copolymer which is xylene insoluble at room temperature, and optionally, (iv) 2 to 20 parts polybutene-1 based on 100 parts of (i)+(ii)+(iii), wherein the ratio of polybutene-1 to rubber is less than 0.5, and (B) 1.4 to 4.0 parts of a zinc salt of a mercapto compound selected from the group consisting of zinc 2-mercaptobenzothiazole, zinc 2-mercaptobenzimidazole and zinc 2-mercaptotoluimidazole, based on 100 parts of (i)+(ii)+(iii).

2. The dynamically partially crosslinked thermoplastic elastomer of claim 1, wherein the zinc salt of a mercapto compound is zinc 2-mercaptobenzothiazole.

3. The dynamically partially crosslinked thermoplastic elastomer of claim 1, wherein the zinc salt of a mercapto compound is zinc 2-mercaptotoluimidazole.

4. The dynamically partially crosslinked thermoplastic elastomer of claim 2, comprising 30 to 50 parts crystalline polypropylene, 50 to 30 parts ethylene-propylene copolymer rubber and 10 to 20 parts semi-crystalline, low density, essentially linear ethylene-propylene copolymer.

5. The dynamically partially crosslinked thermoplastic elastomer of claim 4, further comprising 2 to 15 parts polybutene-1.

6. The dynamically partially crosslinked thermoplastic elastomer of claim 3, comprising 30 to 50 parts crystalline polypropylene, 50 to 30 parts amorphous ethylene-propylene copolymer rubber and 10 to 20 parts semi-crystalline, low density, essentially linear ethylene-propylene copolymer.

7. The dynamically partially crosslinked thermoplastic elastomer of claim 6, further comprising 2 to 15 parts polybutene-1.

8. A dynamically fully crosslinked thermoplastic elastomer comprising, by weight,
(A) 100 parts of thermoplastic elastomer containing (i) 20 to 70 parts propylene polymer material selected from the group consisting of a crystalline polypropylene having an isotactic index of greater than 90% and ethylene-propylene random copolymer having an ethylene content of up to 10%, and (ii) 80 to 30 parts amorphous olefin copolymer rubber selected from the group consisting of ethylene-propylene-non-conjugated diene monomer and ethylene-butene-non-conjugated diene monomer rubber having an ethylene content of from 30 to 70% and a diene content of from 1 to 10% which is xylene soluble at room temperature, and
(B) 1.4 to 4 parts of a zinc salt of a mercapto compound selected from the group consisting of zinc 2-mercaptobenzothiazole, zinc 2-mercaptobenzimidazole and zinc 2-mercaptotoluimidazole, based on 100 parts of (A).

9. The fully crosslinked thermoplastic elastomer of claim 8, wherein the zinc salt of a mercapto compound is zinc 2-mercaptobenzothiazole.

10. The fully crosslinked thermoplastic elastomer of claim 14, wherein the zinc salt of a mercapto compound is zinc 2-mercaptotoluimidazole.

11. The fully crosslinked thermoplastic elastomer of claim 9, comprising 30 to 50 parts crystalline polypropylene, and 50 to 70 parts ethylene-propylene-non-conjugated diene monomer rubber.

12. The fully crosslinked thermoplastic elastomer of claim 10, comprising 30 to 50 parts crystalline polypropylene and 50 to 70 parts ethylene-butene-non-conjugated diene monomer rubber.

* * * * *

UNITED STATES PATENT AND TRADEMARK OFFICE
CERTIFICATE OF CORRECTION

PATENT NO. : 5,196,462

DATED : March 23, 1993

INVENTOR(S) : Dominic A. Berta

It is certified that error appears in the above-identified patent and that said Letters Patent is hereby corrected as shown below:

At col. 3, line 59, change "-NO" to -- $-NO_2$ --.

Signed and Sealed this

Eighth Day of March, 1994

*Attest:*

BRUCE LEHMAN

*Attesting Officer*     *Commissioner of Patents and Trademarks*